Aug. 13, 1968 G. A. POTTER 3,396,553
UNIVERSAL DRIVE UNIT
Filed May 12, 1966 2 Sheets-Sheet 2
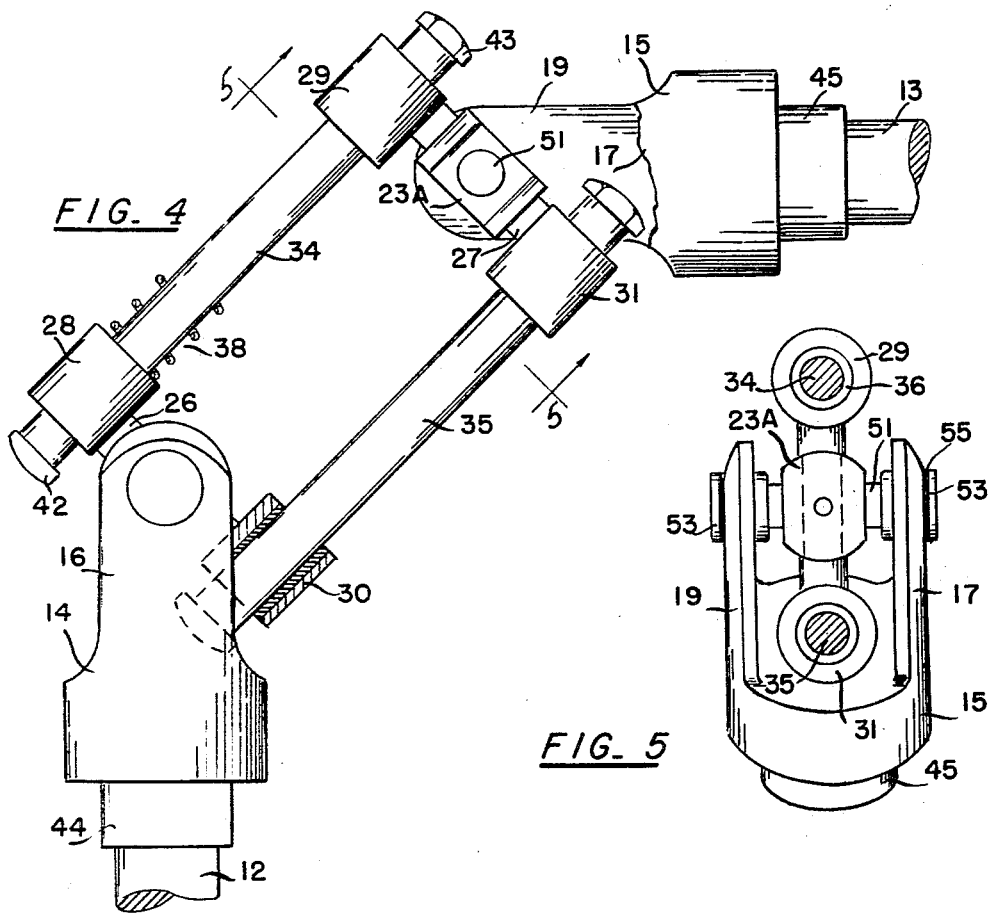
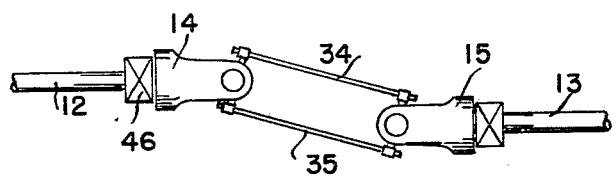
INVENTOR.
GEORGE A. POTTER
BY
ATTORNEY

United States Patent Office 3,396,553
Patented Aug. 13, 1968

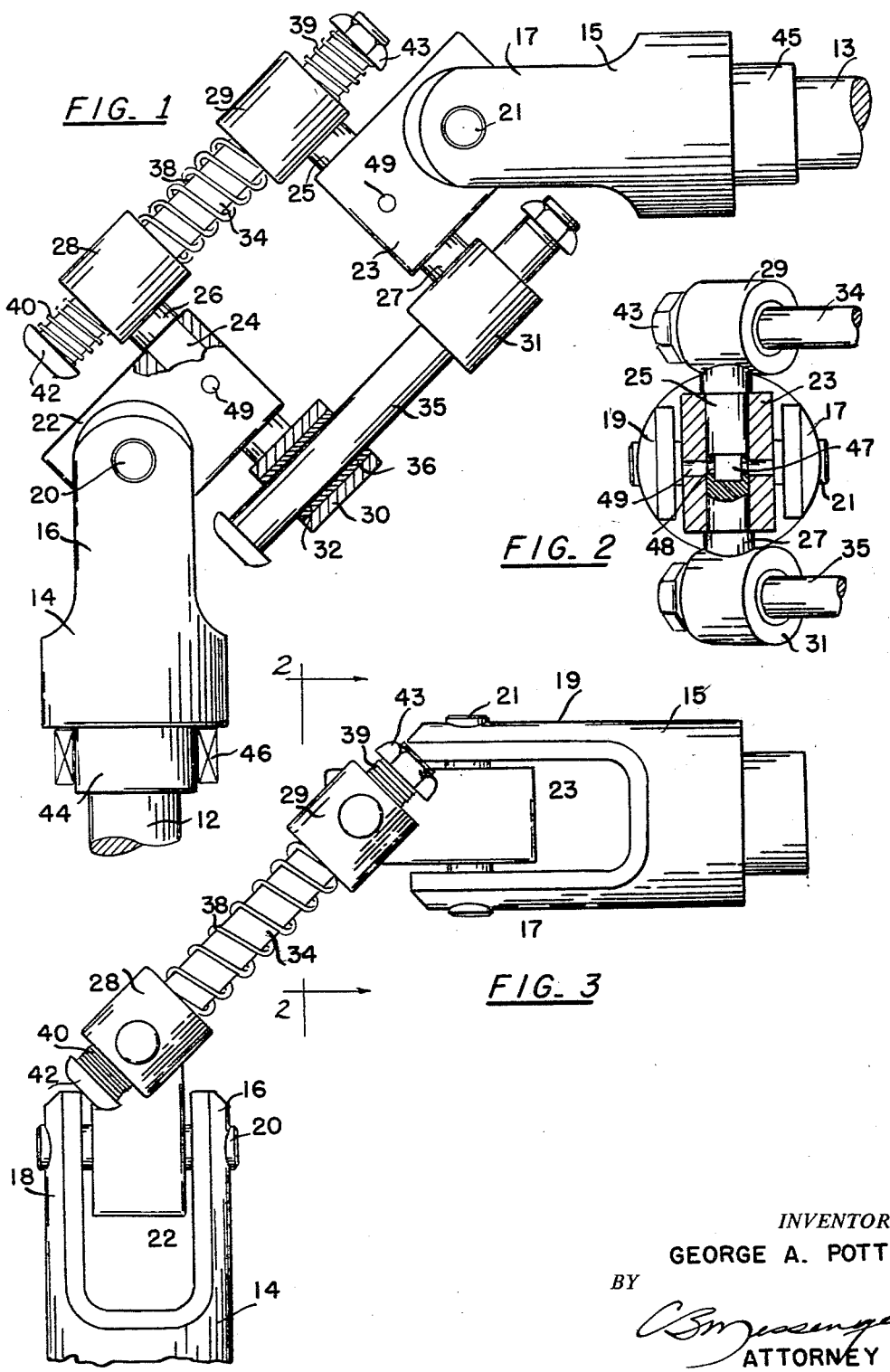

3,396,553
UNIVERSAL DRIVE UNIT
George A. Potter, Denver, Colo.
(860 Orion St., Golden, Colo. 80401)
Filed May 12, 1966, Ser. No. 549,555
10 Claims. (Cl. 64—6)

ABSTRACT OF THE DISCLOSURE

For power transmission between angularly disposed or non-aligned shafts, a universal joint unit in which straight axis guide rods interconnect separate yoke members and in which the guide rods are permitted to move reciprocally to accommodate changes in the effective distance between components of the universal drive unit as the components are rotated.

The present invention is concerned with the provision of a universal drive unit and, more particularly, with a universal joint for transmitting power between shafts positioned at angles up to 90° one from the other. The mechanism further provides means for coupling multiple shafts together that may be non-aligned or in offset positions.

Illustrated embodiments of the invention and all modifications thereof are intended to satisfy the above listed objectives as well as all of the following specific objectives.

A primary object of the present invention is to proivde a drive joint that will transmit rotative power between coupled shafts when the shafts are disposed at angles with respect to each other of up to 90° or more.

A further object of the invention is to provide interconnecting means for universal drive units using yokes of near conventional construction so that the unit will transmit power from one shaft to the other even though the shafts may be arranged at excess angles with respect to each other or in non-aligned or offset positions.

Another object of the invention is to provide a mechanism for interconnecting universal joints and shafts in which the mechanism is inclusive of reciprocally mounted straight axis guide rods.

A further object of the invention is to provide connecting mechanisms as set forth above wherein the guide rods joining components of the universal drive unit are free to rotate about a resulting axis interconnecting the units with the axis of the guide rods themselves being at all times parallel to the axis of interconnection.

Another object of the invention is to provide a universal drive unit for use on angularly disposed shafts in which straight axis guide rods interconnect separate yokes and in which the guide rods are permitted to move reciprocally to accommodate changes in the effective distance between components of the universal drive unit as the components are rotated.

A still further object of the invention is to provide universal drive unit connecting means inclusive of a plurality of single axis guide rods received reciprocally in paired and aligned bushings that are themselves mounted for free turning movement on individual yoke components of the drive unit.

Further and specific objects of the invention will be more readily apparent from the appended description and drawings, in which FIG. 1 is a top plan view of one embodiment of the invention with parts being shown in cross-section, FIG. 2 is a front elevation taken along the line 2—2 of FIG. 3 showing further features of the invention with portions thereof being shown in cross-section, FIG. 3 is a top plan view taken from a position identical with that of FIG. 1 but with the yoke and interconnecting means on the angularly disposed drive shafts having been rotated through an angle of 90°, FIG. 4 is a top plan view illustrating a second embodiment of the invention in which an extension element of a pivot cross component is eliminated, FIG. 5 is an elevation taken along the line 5—5 of FIG. 4 with parts in partial cross-section showing further construction features of the pivot cross component used in this second embodiment of the invention, and FIG. 6 is a plan view showing a universal drive unit used to connect offset shafts.

Briefly stated, the present invention provides a novel type of universal joint designed to permit the delivery of rotative power from drive to driven shafts that may be disposed at an excess angle with respect one to the other. The mechanism is capable of delivering power through an angle of 90° or greater due to the construction of a novel yoke interconnecting mechanism. The interconnecting mechanism provides a cross type of component for each yoke with rotatably mounted and paired slide bushings being provided at the opposite ends of the cross component. The bushings are aligned and parallel each to each, and guide rods are disposed through the bushings of yoke members that are to be joined. The guide rods are free to move reciprocally in the bushings. The guide rods and bushings keep the yoke members together and also serve to transmit power from one yoke to another. When the shafts and yokes are disposed in the same plane but at an angle one to the other, the guide rod axis will at all times be disposed in parallel relation each to each but oriented normal to a plane bisecting the angle between the drive shafts. In one embodiment of the invention the pivot cross components will be made to provide an offset extension so that the two axes of the cross though disposed at right angles one to the other and in parallel planes will be laterally spaced from each other. This embodiment provides additional clearance for working elements of the drive unit, and it can provide a strong drive connection. Where the arms of the pivot cross are in a single plane as in the second embodiment of the invention, the desired beneficial result is attained with a minimum necessary shaft end to end clearance.

In the first embodiment of the invention shown in FIGS. 1 through 3, the universal drive unit is used to connect two shafts 12 and 13 which are disposed at right angles to each other. Yoke members 14 and 15 are connected to the shafts 12 and 13, respectively, with the forks 16 and 18 of the yoke 14 extending upwardly in the illustration, and the forks 17 and 19 extending to the left in the drawing. The pin 20 disposed between forks 16 and 18 provides a rotating mount for pin block 22 of a pivot cross component. Similarly, the pin 21 provides rotating support for pin block 23. At an offset position extending outwardly from the pins 20 and 21, the pin blocks 22 and 23 provide rotating support for further pivot cross component elements in the form of pivot links 24 and 25. At the limits of the pin blocks 22 and 23, the pivot links 24 and 25 are provided with shoulders 26 and 27, so the pivot links will not move reciprocally in the pin blocks. Bushings 28 and 30 are integrally formed on the ends of pivot link 24, while corresponding bushings 29 and 31 are formed on the pivot link 25. The bushings are provided with a central bore 32 adapted to receive guide rods 34 and 35. As shown in FIG. 1, the bore 32 may be provided in a bearing element 36 in order to facilitate the reciprocal movement of the guide rods 34 and 35. The paired bushings 28–30 and 29–31 are disposed with the axes of the bores 32 in parallel alignment. When the drive unit is to be assembled, guide rod 34 may be inserted through the bores 32 of the bushings 28 and 29, and the bores 32 of the bushings 30 and 31 will likewise be in alignment to receive the guide rod 35.

Once assembled the straight axis guide rods will at all times tend to keep the bushings 28–29 and 30–31 aligned. If these elements stay in aligned positions, the pin blocks 22 and 23 will rotate about the pins 20 and 21 as the shafts 12 and 13 are rotated. Two positions for these blocks are shown in FIGS. 1 and 3. At a position intermediate to those illustrated, the blocks 22 and 23 will be disposed at a compound angle due to the combined rotation of the blocks about the pins 20 and 21 and the end over end rotation of the pins 20 and 21 themselves away from the straight up or straight across positions illustrated. The combined motions about the pin axis and the pivot link axis permit the yokes 14 and 15 to rotate so long as the guide rods 34 and 35 are free to reciprocate in the bores 32 of the bushings 28–29 and 30–31. If one shaft is rotated, the force exerted by such shaft will be transmitted to the other shaft by the guide rods 34 and 35.

While the unit is illustrated with the shafts at 90° positions, placement at a decreased angle is permissible, and it has even been found that placements at greater than 90° can be used. In addition to providing a drive arrangement for shafts disposed at angles one to the other, the connector mechanism may also be used to interconnect shafts disposed in parallel but offset positions. For offset use the unit will actually provide a drive connection even though the shaft axes are not strictly parallel.

As indicated by the illustrations of FIGS. 1 and 3, rotation of the shafts 12 and 13 is accompanied by reciprocal movement of the guide rods 34 and 35 in their respective bushings. In the position illustrated in FIG. 1, the bushings are closest together; while in the position shown in FIG. 3, the bushings have moved away from each other. To take care of this reciprocal movement, the guide rods 34 and 35 can be made slightly longer than necessary to provide direct interconnection. If a center spring 38 is disposed about the guide rods between the bushings and if outboard springs 39 and 40 are positioned between the outermost ends of the bushings and a head 42 or lock nut 43 on the ends of the guide rods, the stroke of reciprocal movement will be equally divided between the bushings, and the guide rods will essentially stay centered. When the bushings are furtherest apart, as in FIG. 3, the spring 38 will be extended and the springs 40 and 39 will be compressed. This combined spring action not only tends to center the guide rods to prevent interference between the rods and the forks 16–18 and 17–19 of the yoke members, but it also helps to keep the separate yokes 14 and 15 in position so that driving forces can be transmitted.

Where the springs are used, the universal drive unit could be used without accurately aligned and positioned support for the drive shafts 12 and 13. Accordingly, the universal drive unit can be used to couple hand tools, such as socket sets and the like. For some other permanent installation types of use, it is recognized that the unit will work better if bearing support is provided for the shafts 12 and 13. Where a bearing support is desired, the cylindrical surfaces 44 and 45 on the yokes 14 and 15 may be used. The elements 46 are representative of such bearing installation.

In this first embodiment of the invention, the combination of the pin 20, the pin block 22 and the pivot link 24 is considered as unitarily to be comparable to the cross element of conventional universal joints. The fact that the pivot link itself is able to rotate in the construction, however, provides a structural distinction, and, accordingly, the term "pivot cross" is used to distinguish from the usual universal joint cross member. The term "extension pivot cross" is used to designate the particular form of cross component shown in this first embodiment of the invention where pin block 22 provides an extension displacing the axes of the pin 20 and of the pivot links. Accordingly, though these axes are in parallel planes, as in conventional universal joint cross members, the planes are displaced a distance corresponding to the length of such extension.

In order to keep the bushings 29–31 in aligned positions and in order to use the shoulders 27 to prevent reciprocal movement of the pivot link 25 in the pin block 23, the pivot link must be made in two pieces. FIG. 2 illustrates the construction of the pivot link and the means for joining the separate components together. The pivot link is divided in half, and a plug and socket combination 47 is used to hold the halves in straight axial arrangement. A drift pin 48 is insertable through the plug and socket elements to hold the bores 32 of the bushings 29 and 31 in parallel relationship. When the unit is to be assembled, the drift pin 48 may be inserted through a hole 49 in the pin blocks 23 and 24. While the drift pin 48 and the hole 49 are shown in aligned position in FIG. 2, it is preferable that the elements should not be aligned when the bushings are in position to receive the connecting guide rods 34 and 35. If these elements are not aligned when the drive unit is being used, there will be no tendency for the drift pin 48 to inadvertently escape through the hole 49. The elements can, of course, be brought back into alignment for disassembly or reassembly by removing the guide rods or simply by rotating the separate drive shafts to non-operative angles.

A separate embodiment of the invention is shown in FIGS. 4, 5 and 6. In FIGS. 4 and 5 a drive unit incorporating a different type of pivot cross component is illustrated. In this figure elements of the drive unit that are mechanically or structurally comparable to those previously described have been given the same numbers. All the elements and pieces of the different pivot cross are provided with related numbering. The most significant changed structural feature is embodied in the fact that no offset extension is provided for drive unit clearance. The pin block 23A is of flat configuration, and it is provided with integral stub pin extensions 51 which are receivable in bearing caps 53. The bearing caps 53, which are now often used in conventional universal joint construction, are retained by snap rings 55 and, of course, may be removed from the arms 17 and 19 to free the stub pins 51. In actual construction additional side clearance between the block 23A and the inner surface of the arms 17 and 19 will be provided to facilitate removal and replacement of this pivot cross element.

The construction of the pivot link component is directly comparable to that previously described. As in the previous embodiment, the pivot link extends through the pin block 23A for free rotation therein. Springs can be disposed between opposed bushings and between the ends of the guide rods 34–35 and the outer limits of the bushings. In the construction of this type of drive unit, the geometry of the components should be closely controlled so that no interference will exist between the guide rod ends or the bushings and the arms of the yoke members.

When properly designed, the unit will be capable of transmitting drive forces through angles of up to 90°. One inherent advantage of this embodiment is the fact that fewer parts are involved, and less wobble movement for the pin block component is noted. The same degree of freedom in the relative positioning of driving and driven shafts may not be possible, but at the same time the decreased clearance requirement between the shafts can make this embodiment useful in installations where the first embodiment could not be installed. By shortening the guide rods, the yoke members of separate shafts may be brought into closer positions than those illustrated. By providing guide rods of increased length for either embodiment of the invention, the shaft separation distance may be increased. A practical limitation for such separation distance would be governed only by long column bending stresses in the lengthened guide rods.

Incidentally, one prime advantage inherent in the present embodiment designs permits the drive units here disclosed to be used in installations where the end spacing between shafts is not closely regulated or even fixed. The greater freedom and ease of installation and use adds utility to the novel concept.

While it is believed that the primary use for drive units made in accordance with this invention would be for coupling angularly disposed shafts, the units may be used to couple shafts that are misaligned or that are in offset positions. An illustration of such usage is provided in FIG. 6. For offset installations the unit can compensate for misalignment in addition to the offset displacement. Accordingly, the units can be used for interconnecting many different drive and driven shaft combinations. It is expected that the unit will be especially beneficial in the field for out of plant or temporary drive combinations. Its use in connection with implements and auxiliary equipment would be beneficial. A further usage of prime interest would be in the provision of an angle drive unit for socket sets or for similar hand or power tool combinations. When used with socket wrenches, the spring combination illustrated will serve to keep the unit in proper drive relationship, and no additional bearing supports should be needed. In other portable uses where the shafts are to be rotated at high speeds, some type of bearing support for the separate yokes may be advisable. The type of scissors connected bearing support shown in Masse, U.S. Patent No. 1,334,388 may be modified to provide bearing support for the drive units disclosed herein.

While separate embodiments of the invention have been shown and described, it should be apparent that the novel features of this invention are adaptable to modifications and changes. All such modifications and changes that come within the scope of the appended claims are considered to be a part of this invention.

I claim:

1. A universal drive unit for the transmission of drive forces between drive and driven shafts that may be disposed at excess angular, or in misaligned, positions one to the other comprising yoke members on each of said shafts, a pivot cross for each yoke member, a first arm of said pivot cross engaging and rotatably mounted with respect to its associated yoke member, a second link arm for said pivot cross disposed at an angular position with respect to said first arm, said second arm being rotatably mounted with respect to said pivot cross and first arm, paired bushings on the opposite ends of said second link arm providing parallel bore openings aligned each to each, and guide rods extending between and being reciprocally received in the bore openings of pivot cross bushings for connecting separate yoke and pivot cross members whereby rotary movement of the drive shaft is transmitted to the driven shaft.

2. Structure as set forth in claim 1 wherein said bushings and bore openings extend at right angles to said second arm.

3. Structure as set forth in claim 1 wherein each said guide rod has a single straight axis.

4. Structure as set forth in claim 3 wherein said guide rod axis is disposed at equal angles to the axis of said drive and driven shafts when the drive unit is used to connect shafts disposed at angular positions each to each.

5. Structure as set forth in claim 1 wherein the first and second arms of said pivot cross are disposed in a single plane.

6. Structure as set forth in claim 1 wherein the first and second arms of said pivot cross are disposed in parallel planes.

7. Structure as set forth in claim 6 inclusive of a pin block in said pivot cross assembly providing an extension between said first and second pivot cross arms.

8. Structure as set forth in claim 1 inclusive of spring members on said guide rods for holding said bushings and yoke members in non-interfering positions.

9. Structure as set forth in claim 8 inclusive of guide rods of length to extend past said bushings and wherein said spring members are disposed on the guide rods between the interconnected bushings and between the bushings and the guide rod ends.

10. Structure as set forth in claim 6 wherein the first and second arms of said pivot cross are disposed at right angles.

References Cited
UNITED STATES PATENTS

| | | | |
|---|---|---|---|
| 576,442 | 2/1897 | Fenner | 64—6 |
| 901,080 | 10/1908 | Dock | 64—10 |
| 1,411,069 | 3/1922 | Thiemer | 64—17 |
| 2,476,473 | 7/1949 | Ashton | 64—17 |

HALL C. COE, *Primary Examiner.*